(12) United States Patent
O'Rorke et al.

(10) Patent No.: US 11,746,710 B2
(45) Date of Patent: Sep. 5, 2023

(54) HYDRAULICALLY RATE LIMITED VALVE

(71) Applicant: Hamilton Sundstrand Corporation, Charlotte, NC (US)

(72) Inventors: Morgan O'Rorke, West Hartford, CT (US); Ryan Susca, Windsor, CT (US); Todd Haugsjaahabink, Springfield, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/533,668

(22) Filed: Nov. 23, 2021

(65) Prior Publication Data

US 2023/0160349 A1 May 25, 2023

(51) Int. Cl.
| | |
|---|---|
| *F02C 9/00* | (2006.01) |
| *F02C 9/26* | (2006.01) |
| *F02C 3/00* | (2006.01) |

(52) U.S. Cl.
CPC .............. *F02C 9/263* (2013.01); *F02C 3/00* (2013.01); *F05D 2220/32* (2013.01); *F05D 2240/35* (2013.01)

(58) Field of Classification Search
CPC ............................ F02C 9/263; F15B 13/0402
See application file for complete search history.

(56) References Cited

U.S. PATENT DOCUMENTS

| | | | | |
|---|---|---|---|---|
| 4,530,487 A | * | 7/1985 | Tew .......................... | F15B 9/12 251/129.2 |
| 5,209,058 A | * | 5/1993 | Sparks ...................... | F02C 9/38 60/734 |
| 6,981,359 B2 | | 1/2006 | Wernberg et al. | |
| 7,836,676 B2 | | 11/2010 | Futa, Jr. et al. | |
| 2005/0045239 A1 | * | 3/2005 | Krieger ................... | B62D 5/062 138/44 |
| 2007/0199301 A1 | * | 8/2007 | Shelby .................... | F02C 9/263 60/39.281 |
| 2008/0289338 A1 | * | 11/2008 | Desai ...................... | F04C 14/02 60/734 |
| 2012/0067022 A1 | | 3/2012 | Futa et al. | |
| 2013/0263826 A1 | * | 10/2013 | Bickley ..................... | F02C 9/32 123/506 |
| 2014/0205472 A1 | * | 7/2014 | Hutto, Jr. ................ | F02C 7/236 417/244 |
| 2021/0388773 A1 | * | 12/2021 | Zielinski .............. | G05D 7/0647 |

OTHER PUBLICATIONS

European Search Report for EP Application No. 22208919.5 dated Jul. 13, 2023.

* cited by examiner

*Primary Examiner* — Katheryn A Malatek
(74) *Attorney, Agent, or Firm* — Carlson, Gaskey & Olds, P.C.

(57) ABSTRACT

A fluid flow system includes a main valve having a spool, a first chamber, and a second chamber. A pressure difference between the first chamber and the second chamber is configured to move the spool to control fluid flow. An electromechanical meter interface device (EMID) is in fluid communication with at least one of the first and second chambers of the main valve. The EMID is configured to meter fluid from a first source and a second source to the at least one of the first chamber and the second chamber. The first source has a different pressure from the second source. A fixed orifice is arranged between the main valve and the EMID. A fuel system for a gas turbine engine is also disclosed.

13 Claims, 5 Drawing Sheets

HYDRAULICALLY RATE LIMITED VALVE

BACKGROUND OF THE INVENTION

This application relates to a valve and an electromechanical interface device (EMID) for use with a variable pressure supply.

Valves are used in any number of applications. In one application a metering valve is incorporated into a fuel supply system for supplying fuel to a combustor nozzle on a gas turbine engine.

EMIDS, such as electrohydraulic servo valves (EHSV) are also used in many applications. In one application an EHSV is incorporated to control hydraulic fluid flow to control the position of a metering valve.

There are a number of challenges with providing adequate fluid flow across such valve under different conditions.

SUMMARY OF THE INVENTION

A fluid flow system includes a main valve having a spool, a first chamber, and a second chamber. A pressure difference between the first chamber and the second chamber is configured to move the spool to control fluid flow. An electromechanical interface device (EMID) is in fluid communication with at least one of the first and second chambers of the main valve. The EMID is configured to meter fluid from a first source and a second source to the at least one of the first chamber and the second chamber. The first source has a different pressure from the second source. A fixed orifice is arranged between the main valve and the EMID.

A fuel system for a gas turbine engine is also disclosed.

These and other features of the present invention can be best understood from the following specification and drawings, the following of which is a brief description.

DETAILED DESCRIPTION

Figure 1:
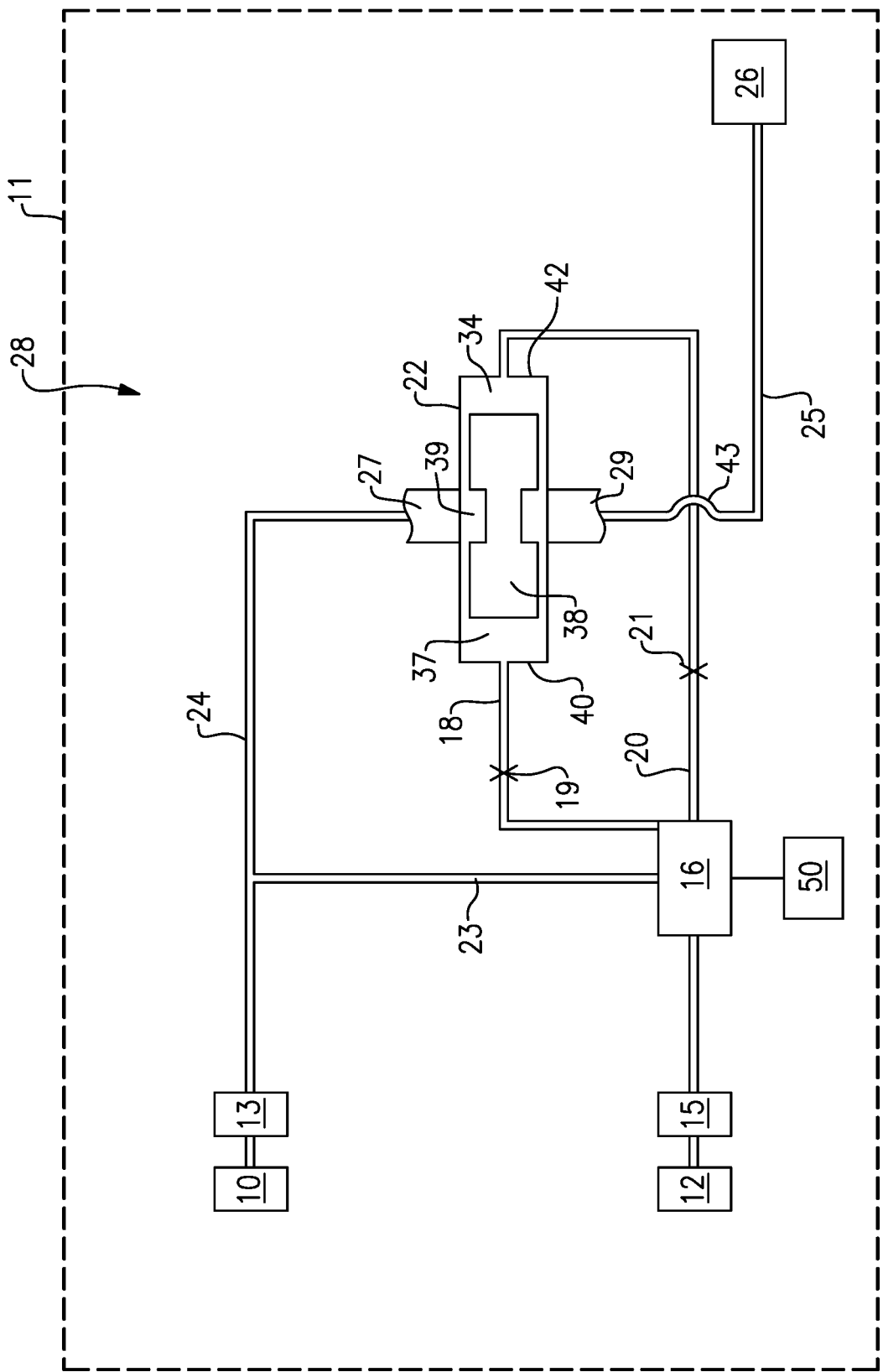
FIG. 1 shows a fluid flow system according to an exemplary embodiment.

A fluid flow system 28 is illustrated in FIG. 1. The fluid flow system 28 may be used to meter fuel to a nozzle 26 on an engine 11, for example. The engine 11 may be a gas turbine engine, for example. Gas turbine engines are known, and may generally include a fan section, a compressor section, a combustor section and a turbine section, among other components. The nozzle 26 may be a nozzle 26 into a combustor section. The fluid flow system 28 may be utilized for applications other than fuel supply.

The fluid flow system 28 generally includes an electromechanical interface device (EMID) 16 and a metering valve 22. The EMID 16 may be an electrohydraulic servo valve (EHSV), torque motor, or other device, for example. The EMID 16 and metering valve 22 control fluid to the nozzle 26 from a variable pressure source. A first fluid source 10 and a second fluid source 12 are in communication with the EMID 16 and then the metering valve 22. In some examples, fluid from the first fluid source 10 also flows to the metering valve 22 to be delivered to nozzle 26. In one example, the first fluid source 10 is a high-pressure fluid source and the second fluid source 12 is a low-pressure fluid source. In some examples, a pump 13, 15 at each of the first and second fluid sources 10, 12, respectively, supplies the fluid to the system 28. In this embodiment each source 10 and 12 are fuel.

In some examples, additional fluid flow lines 23, 24 connect the first source 10 to the EMID 16 and the metering valve 22. Fluid flow line 24 connects the first source 10 and the inlet port 27 of the metering valve 22. Fluid flow line 23 connects the first source 10 and the EMID 16. A fluid line 25 connects the metering valve 22 to the fuel nozzle 26.

In this example, the EMID 16 is in fluid communication with the metering valve 22 via two fluid lines 18, 20. The EMID 16 modulates fluid from the high-pressure source 10 and the low-pressure source 12 to achieve a pressure differential to the metering valve 22. An electronic control 50, shown schematically, selectively controls the EHSV 16.

The first fluid line 18 is in communication with a first chamber 37 at a first end 40 of the metering valve 22. The second fluid line 20 is in communication with a second chamber 34 at a second end 42 of the metering valve 22. The metering valve 22 also includes a spool 38 arranged between the first and second chambers 37, 34. An annulus 39 is defined about the spool 38. The annulus 39 is in communication with an inlet port 27 and an outlet port 29. A pressure difference between the first and second chambers 37, 34 moves the spool 38, which meters fluid between the inlet and outlet ports 27, 29 by blocking portions of the inlet and/or outlet ports 27, 29. The speed at which the spool 38 moves based on the pressure differences between the chambers 37, 34 is known as the slew rate.

Hydraulic control of a metering valve 22 through an EMID 16 is dependent upon the pressure within the system 28. Thus, for a given fluid supply, the slew rate of the metering valve 22 will increase as the pressure differential between lines 18 and 20 is increased. The EHSV 16 controls the pressure acting on either end of the metering valve 22 to achieve a desired position for spool 38.

As the pressure changes between the chambers 37, 34 the slew rate may increase. It is undesirable for the slew rate to exceed a predetermined threshold. To prevent the pressure differences that cause a slew rate above the predetermined threshold, fixed orifices 19 and 20 may be arranged between the EMID 16 and the metering valve 22.

In this example, a first fixed orifice 19 is arranged along the first fluid line 18 and a second fixed orifice 21 is arranged along the second fluid line 20. The fixed orifices 19, 21 are arranged between the EMID 16 and metering valve 22 to limit the flow rate of fuel to the metering valve 22. The fixed rate orifices 19, 21 are sized to maintain the flow of fluid within a predetermined pressure range. For example, there may be a predetermined threshold flow rate that is a maximum flow rate and the orifices 19, 21 are sized to ensure the pressure difference between the first chamber 37 and the second chamber 34 remains below the predetermined threshold. This maintains the slew rate below the predetermined maximum.

While this application specifically discloses a metering valve in a fuel system, other valves for controlling fluid flow in other applications may benefit from the teachings of this disclosure.

Figure 2:
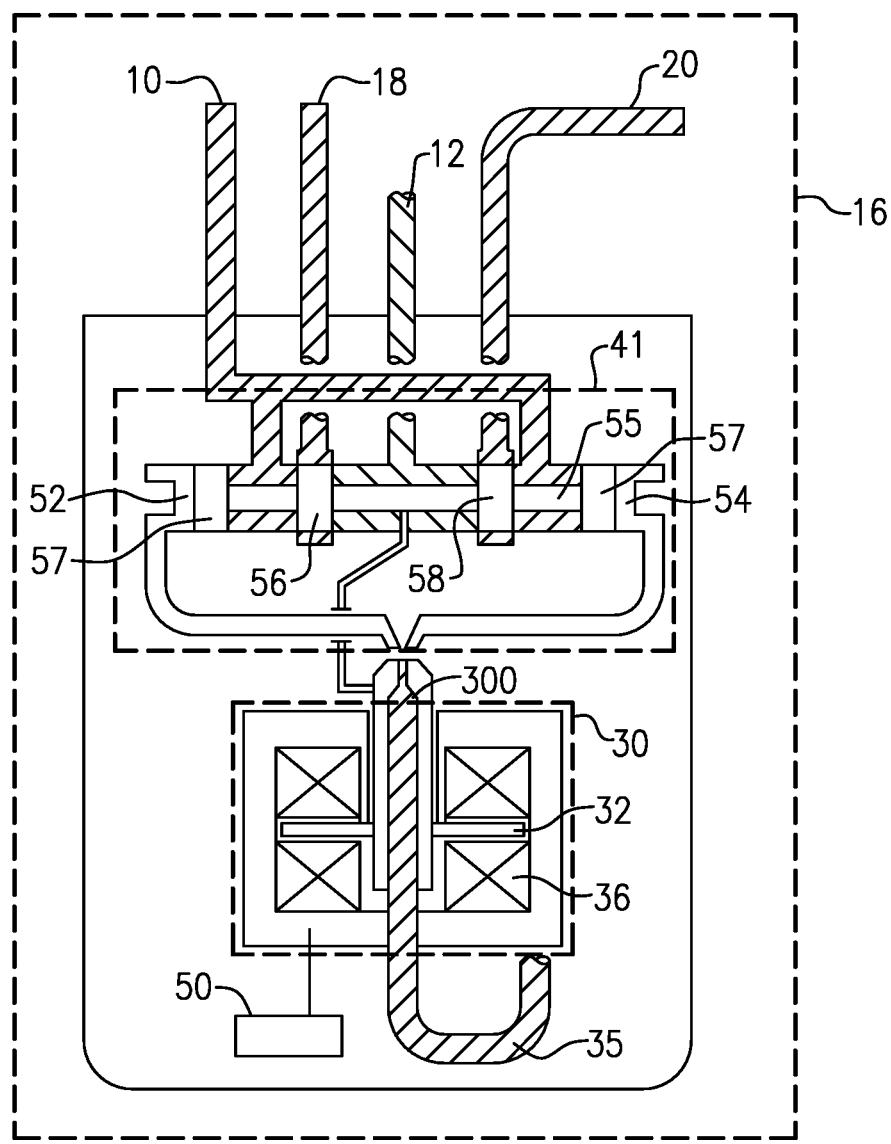
FIG. 2 shows an exemplary electrohydraulic servo valve (EHSV).

FIG. 2 shows an example EMID 16. In this example, the EMID 16 is an electrohydraulic servo valve (EHSV). The EHSV 16 has two stages including a torque motor 30 and a hydraulic mechanism 300 used to drive a spool 55 of a spool valve 41. The torque motor 30 controls the flow of hydraulic fluid which drives the hydraulic mechanism 300 and the spool 55. The torque motor 30 includes an armature 32 and magnetic coils 36. The armature 32 is positioned by the magnetic force from the energized coils 36 to provide a supply pressure 35 to position the hydraulic mechanism 300. The hydraulic mechanism 300 attached to the torque motor 30 may be a jet type, or any other type of hydraulic mechanism.

The spool 55 has a right spool valve land 58 and a left spool valve land 56 on a spool 55. The right spool valve land 58 controls communication with the second fluid line 20 and the left spool valve land 56 controls communication with the first fluid line 18. The spool 55 moves in response to fluid pressure in a left spool chamber 52 and a right spool chamber 54. End lands 57 provide reaction surfaces for fluid in chambers 52 and 54. Source 10 is directed into chambers between end lands 57 and each of lands 56 and 58. Source 12 is directed into a chamber between lands 56 and 58. Electronic control 50 positions spool 55 such that a desired mix from sources 10 and 12 passes into lines 18 and 20, to in turn achieve a desired position of the spool 38 in metering valve 22. This provides a desired flow of fuel through metering valve.

Figure 3:
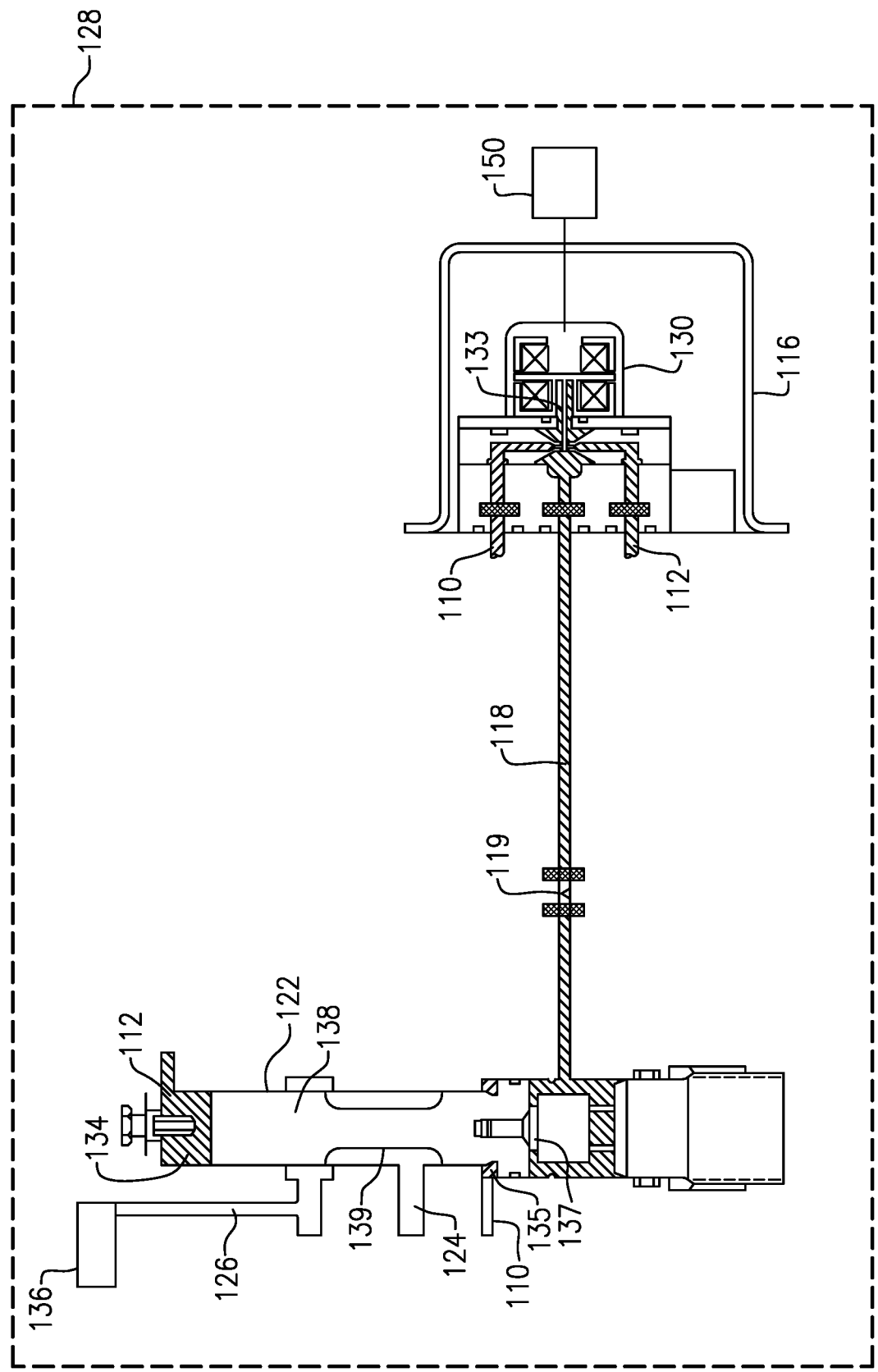
FIG. 3 shows another example fluid flow system having a single stage servo valve (SSSV).

FIG. 3 illustrates another example of a fluid flow system 128. To the extent not otherwise described or shown, the fluid flow system 128 corresponds to the fluid flow system 28 of FIGS. 1 and 2, with like parts having reference numerals pre-appended with a "1." The EMID 116 in the system 128 is a single stage servo valve (SSSV) 116. The SSSV 116 is in communication with a high pressure source 110 and a low pressure source 112. The SSSV 116 includes a flapper 133 that moves in response to current through a torque motor 130. Fluid flowing through the flapper 133 flows from the fluid sources 110, 112 to the first fluid line 118 and then to the metering valve 122. Electronic control 150 controls the torque motor 130 to achieve a desired mix between lines 110 and 112 into line 118.

The fluid line 118 connects the SSSV 116 to a first chamber 137 of the metering valve 122. A second chamber 134 is in communication with the second fluid source 112. A third chamber 135 is in communication with source 112. A fluid pressure difference between the first and third chambers 134, 135 in combination, acts against a mixed flow from line 118 in chamber 137. This moves the spool 138 to modulate fluid flowing to the nozzle 136 through line 126. As spool 138 moves an annulus 139 selectively controls flow between inlet line 124, from source 110, and to outlet line 126. Control 150 controls the mixed pressure on line 118 to position spool 138.

An orifice 119 arranged along the first fluid line 118 between the SSSV 116 and the metering valve 122 limits the pressure of fluid flowing into the first chamber 137. The fixed orifice 119 limits the slew rate of the metering valve 122 by preventing large pressure differences between the chambers 134/135 and 137.

In the event of a failure of the EMID 16, 116, it is possible high pressure fluid only may be directed to one side of either metering valve 22, 122, causing a high slew rate. A high slew rate of the metering valve 22, 122 would be undesirable. The fixed orifices 19, 21, 119 arranged between the EMID 16, 116 and the metering valve 22, 122 help to ensure the metering valve 22, 122 is not exposed to fluid pressure differentials above a predetermined threshold.

Figure 4A:
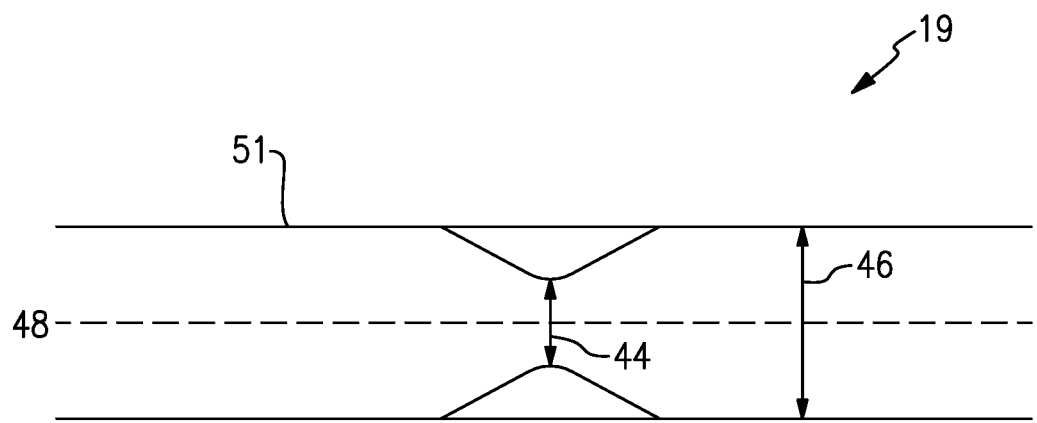
FIG. 4A shows a detail of an example fixed orifice.

FIG. 4A shows an example orifice 19. Although the example orifice 19 is shown, this description may also apply to the orifice 21 in FIG. 1 and orifice 119 in FIG. 3. In this example, the orifice 19 is arranged along a pipe 51 and maintains valve slew rates at the metering valve 22 below a predetermined threshold. The orifice 19 has an inner diameter 44 that is smaller than a nominal diameter 46 of the pipe 51.

Figure 4B:
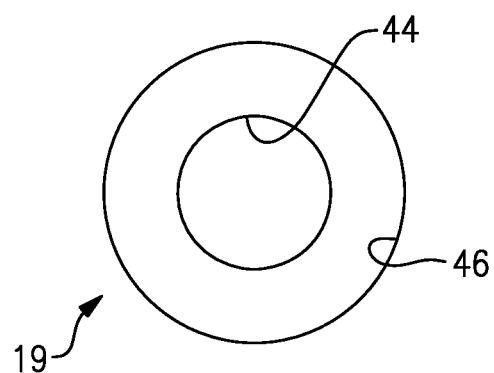
FIG. 4B shows a cross-sectional view of the example fixed orifice of FIG. 4A.

As shown in FIG. 4B, the orifice 19 extends inward of the pipe 51 and is symmetric about the longitudinal axis 48 of the pipe 51. In other words, the orifice 19 extends into the pipe 51 about a circumference of the pipe 51. This configuration limits the slew rates during a failed EMID 16 condition by limiting the pressure of fluid flowing to the metering valve. Although a particular orifice 19 is shown, other orifice configurations may be used. The diameters 44, 46 may be selected based on a particular application to maintain the slew rate below a predetermined threshold.

Figure 5:
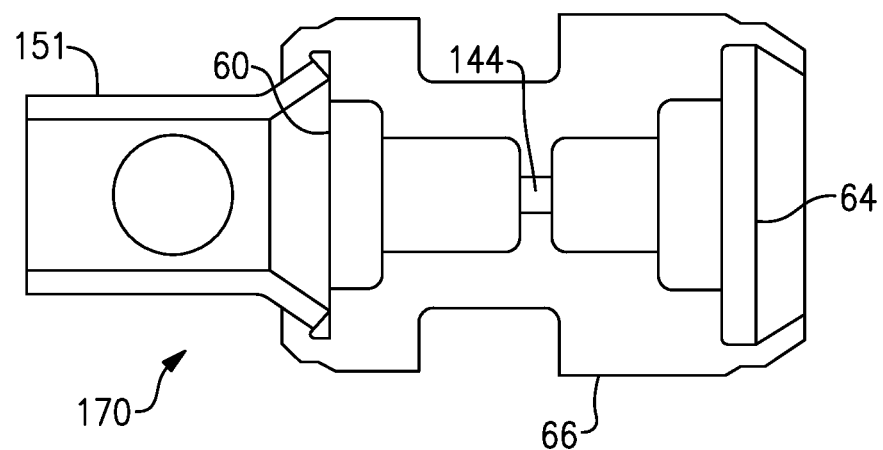
FIG. 5 shows an example fixed orifice.

FIG. 5 shows another example orifice 170. The orifice 170 is arranged within a housing 66. In this example, a first screen 60 and a second screen 64 are arranged on opposite sides of restriction 144. The screens 60, 64 protect the restriction 144 from debris in the fluid.

Figure 6:
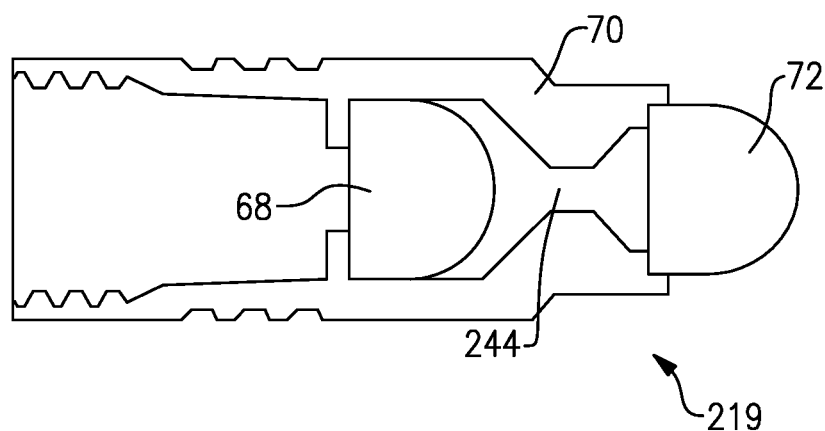
FIG. 6 shows another example fixed orifice.

FIG. 6 shows another example orifice 219. The orifice 219 includes a housing 70. A first screen 68 and a second screen 72 are arranged on opposite sides of the restriction 244.

The disclosed system eliminates concerns about undesirably high slew rates with a simple construction using fixed orifices to maintain the valve slew rates within a safe range. This arrangement limits the slew rates when the EMID fails. This arrangement may reduce cost and weight and improve reliability of the fuel metering system.

While this disclosure specifically describes a metering valve in a fuel supply, it could be used in other applications. As examples, it could be used with actuators for other functions on an engine, such as for variable vane stator actuators, pneumatic valves, bleed valves, or other applications.

A fluid flow system under this disclosure could be said to include a metering valve having a spool, a first chamber, and a second chamber. A pressure difference between the first chamber and the second chamber is configured to move the spool to meter a fluid. The metering valve is in fluid communication with a use. An electromechanical meter interface device (EMID) is in fluid communication with at least one of the first and second chambers of the metering valve. The EMID is configured to meter fluid from a first source and a second source to at least one of the first chamber and the second chamber. The first source has a different pressure from the second source. At least one fixed orifice is arranged between the metering valve and the EMID.

The first chamber may be in communication with the EMID via a first fluid line and the second chamber is in communication with the EMID via a second fluid line. The at least one fixed orifice includes a pair of fixed orifices, with one of the fixed orifices on the first fluid line and one on the second fluid line.

Alternatively, one of the first and second chambers may be is in fluid communication with the EMID via a first line, and the other of the first and second chambers is in fluid communication with one of the first and second sources without passing through the EMID, and the fixed orifice is on the first line.

A fluid flow system under this disclosure could also be said to include a metering means for metering fluid flow from a fluid source to a use. Control valve means direct a fluid source mixed from a first fluid source and a second fluid source through a first line to control a volume of fluid metered by the metering means. Fixed restriction means on the first line limit a pressure from the control valve means reaching the metering means.

The metering means may be a spool valve. The control valve means may be an electromechanical interface device and the fluid restrictions means may be a fixed orifice.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. A fluid flow system comprising:
    a main valve having a spool, a first chamber, and a second chamber, wherein a pressure difference between the first chamber and the second chamber is configured to move the spool to control a fluid flow;
    an electromechanical interface device (EMID) in fluid communication with at least one of the first and second chambers of the main valve, the EMID configured to meter fluid from a first source and a second source to at least one of the first chamber and the second chamber, wherein the first source has a different pressure from the second source; and
    wherein the first chamber is in communication with the EMID via a first fluid line and the second chamber is in communication with the EMID via a second fluid line, with a first fixed orifice on the first fluid line and a second fixed orifice on the second fluid line, with both of said first and second fixed orifices being between the main valve and the EMID; wherein the first fluid line is structurally separate from the second fluid line.

2. The fluid flow system as set forth in claim 1, wherein the EMID is an electrohydraulic servo valve (EHSV).

3. The fluid flow system as set forth in claim 1, wherein a first pump is configured to pump the fluid from the first source to the EMID and a second pump is configured to pump the fluid from the second source to the EMID.

4. The fluid flow system as set forth in claim 1, wherein the first fixed orifice is arranged in a pipe, the first fixed orifice having a diameter that is smaller than a nominal diameter of the pipe.

5. The fluid flow system as set forth in claim 4, wherein the first fixed orifice is symmetric about a longitudinal axis of the pipe.

6. The fluid flow system as set forth in claim 1, wherein the use is a gas turbine engine combustor, and the first and second sources are fuel sources and the main valve is a metering valve.

7. A fluid flow system comprising:
    a main valve having a spool, a first chamber, and a second chamber, wherein a pressure difference between the first chamber and the second chamber is configured to move the spool to control a fluid flow;
    an electromechanical interface device (EMID) in fluid communication with at least one of the first and second chambers of the main valve, the EMID configured to meter fluid from a first source and a second source to at least one of the first chamber and the second chamber, wherein the first source has a different pressure from the second source;
    at least one fixed orifice arranged between the main valve and the EMID; and
    wherein one of the first and second chambers is in fluid communication with the EMID via a first line, and the other of the first and second chambers is in fluid communication with one of the first and second sources without passing through the EMID, and the fixed orifice is on the first line.

8. The fluid flow system as set forth in claim 7, wherein the EMID is a single stage servo valve (SSSV).

9. A fuel system for a gas turbine engine comprising:
    a fuel tank, and a combustor in the gas turbine engine;
    a metering valve having a spool, a first chamber, and a second chamber, wherein a pressure difference between the first chamber and the second chamber is configured to move the spool to meter a fluid, the metering valve in fluid communication with the fuel tank and the combustor;
    an electromechanical meter interface device (EMID) in fluid communication with the first and second chambers of the metering valve, the EMID configured to meter fluid from a first fuel source and a second fuel source to at least one the first chamber and the second chamber, wherein the first fuel source has a different pressure from the second fuel source; and
    wherein the first chamber is in communication with the EMID via a first fluid line and the second chamber is in communication with the EMID via a second fluid line, with a first fixed orifice on the first fluid line and a second fixed orifice on the second fluid line, with both of said first and second fixed orifices being between the main valve and the EMID; wherein the first fluid line is structurally separate from the second fluid line.

10. The fluid flow system as set forth in claim 9, wherein the EMID is an electrohydraulic servo valve (EHSV).

11. The fuel system as set forth in claim 9, wherein a first pump is configured to pump the fluid from the first fuel source and a second pump is configured to pump the fluid from the second fuel source to the EMID.

12. The fuel system as set forth in claim 9, wherein the first fixed orifice is arranged in a pipe, the first fixed orifice having a diameter that is smaller than a nominal diameter of the pipe.

13. The fuel system as set forth in claim 12, wherein the first fixed orifice is symmetric about a longitudinal axis of the pipe.

* * * * *